United States Patent
Sauder et al.

(10) Patent No.: US 10,952,367 B2
(45) Date of Patent: Mar. 23, 2021

(54) APPLICATION CONTROL AND MONITORING APPARATUS, SYSTEMS AND METHODS

(71) Applicant: Precision Planting, LLC, Tremont, IL (US)

(72) Inventors: Derek Sauder, Tremont, IL (US); Phil Baurer, Tremont, IL (US); Ryan Allgaier, East Peoira, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 16/395,432

(22) Filed: Apr. 26, 2019

(65) Prior Publication Data

US 2019/0246552 A1    Aug. 15, 2019

Related U.S. Application Data

(62) Division of application No. 14/888,231, filed as application No. PCT/US2014/036226 on Apr. 30, 2014, now Pat. No. 10,390,478.

(60) Provisional application No. 61/817,364, filed on Apr. 30, 2013.

(51) Int. Cl.
*A01C 7/12*   (2006.01)
*A01C 21/00*  (2006.01)
*A01B 79/00*  (2006.01)
*G01D 5/14*   (2006.01)
*A01C 7/10*   (2006.01)

(52) U.S. Cl.
CPC .............. *A01C 7/12* (2013.01); *A01B 79/005* (2013.01); *A01C 7/102* (2013.01); *A01C 21/005* (2013.01); *G01D 5/14* (2013.01); *A01C 7/105* (2013.01)

(58) Field of Classification Search
CPC ......... A01C 7/12; A01C 7/102; A01C 21/005; A01C 7/105; A01B 79/005; G01D 5/14
See application file for complete search history.

(56) References Cited

U.S. PATENT DOCUMENTS 6,192,813 B1 *  2/2001  Memory ............... A01C 7/105
                                                       111/176

* cited by examiner

*Primary Examiner* — Roy Y Yi
*Assistant Examiner* — Geoffrey T Evans

(57) ABSTRACT

Systems, methods and apparatus are provided for determining corrected population based on a meter drive signal. Systems, methods, and apparatus are additionally provided for determining a stability metric based on a meter drive signal. A method for monitoring a seed application rate of a seed planter includes measuring a rotation of a seed disc of a seed meter, measuring a performance value corresponding to the seed meter, and calculating the population value based on the rotation and the meter performance value.

14 Claims, 6 Drawing Sheets

APPLICATION CONTROL AND MONITORING APPARATUS, SYSTEMS AND METHODS

CROSS-REFERENCE TO RELATED APPLICATIONS

The present application is a divisional of U.S. patent application Ser. No. 14/888,231, filed Oct. 30, 2015 as a U.S. National Phase Application of International Patent Application PCT/US2014/036226, filed Apr. 30, 2014, and published in English as WO 2014/179488 A1, which claims the benefit of and priority from U.S. Provisional Patent Application 61/817,364, filed Apr. 30, 2013. The entire disclosure of each of the above-referenced applications are hereby incorporated by reference.

BACKGROUND

In recent years, farmers and agronomists have increasingly recognized the importance of population (i.e., the number of seeds planted per acre) in maximizing yield and profit in the cultivation of corn and other crops. Thus there is a need in the art for improved systems and methods for controlling and monitoring application rates, particularly seed planting population.

DESCRIPTION

Application Control and Monitoring Systems

Figure 1:
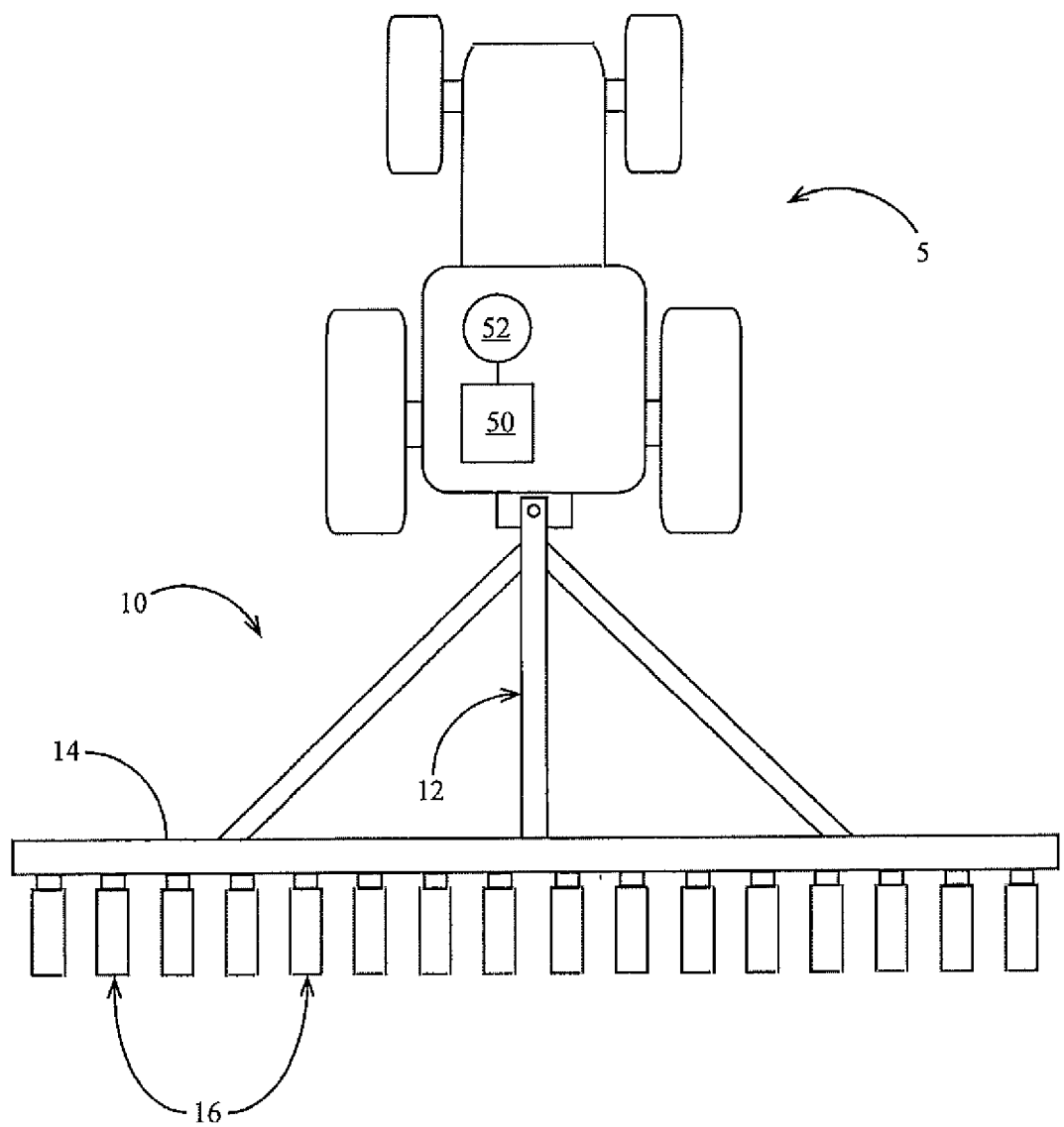
FIG. 1 is a top view of an embodiment of a row crop planter.
Figure 2:
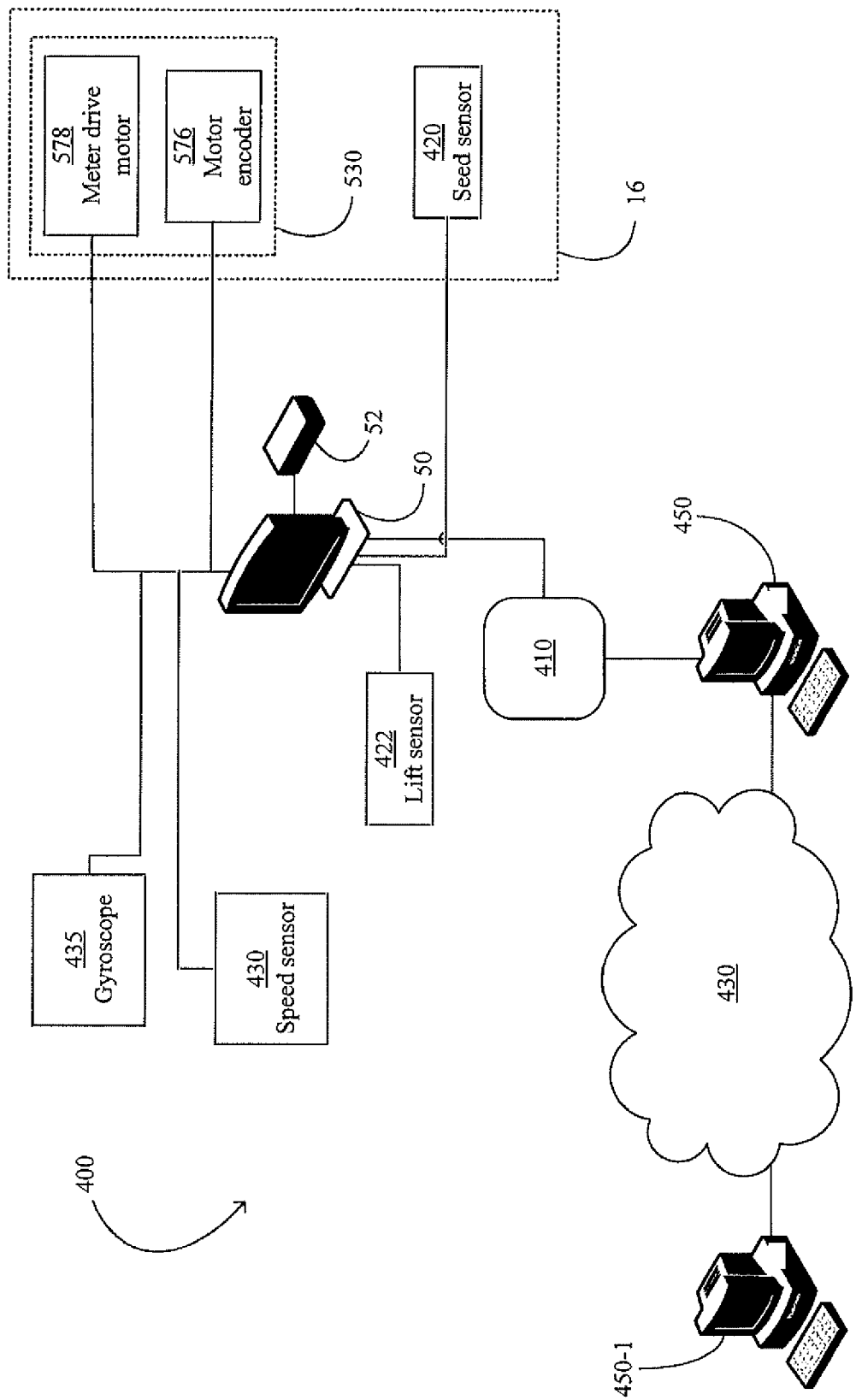
FIG. 2 schematically illustrates an embodiment of a system for controlling a planter and gathering planting data.

Referring now to the drawings, wherein like reference numerals designate identical or corresponding parts throughout the several views, FIG. 1 illustrates a top view of a tractor 5 pulling a planter 10 used to plant row crops. The planter 10 includes a frame 12, in which a toolbar 14 extends transversely as a mounting structure for row units 16, each of which is configured to plant seeds in a row as is known in the art. Each row unit 16 preferably includes a seed meter 530 (FIG. 2) configured to plant at variable population rates (i.e., number of seeds per acre) as disclosed in U.S. Provisional Patent Application 61/675,714 ("the '714 application"), the entire disclosure of which is incorporated herein by reference.

The planter 10 preferably includes one or more drives 578 (FIG. 2) for varying the population rate planted by each row unit 16 or a group of row units. A drive 578 is operably coupled to each row unit 16 (e.g., to the seed meter 530 of the row unit) and configured to vary the application rate of each row unit associated with the drive based on a signal received from the monitor 50. The drives 578 preferably comprise electric motor drives mounted to each seed meter 530 as disclosed in the '714 application.

The planter 10 preferably includes a motor encoder 576 (FIG. 2) associated with a seed meter of each row unit 16. The motor encoder 576 is preferably configured to generate a signal representative of the speed at which the motor drives a seed disc of the seed meter. A ring magnet mounted to the drive 578 preferably causes the motor encoder 576 a known number of encoder pulses (e.g., 8) for each rotation of the motor; it should be appreciated that each rotation of the motor corresponds to a number of rotations of the seed disc according to a known drive ratio. In alternative embodiments, a Hall-effect encoder is mounted adjacent to the seed disc and a magnet associated with the seed disc causes the encoder to generate a known number of encoder pulses for each rotation of the seed disc.

The planter 10 further preferably includes one or more seed sensors 420 (FIG. 2) associated with each row unit 16 for detecting the time of seed deposition as well as the population rate planted by each row unit 16. Each seed sensor 420 is preferably mounted to one of the row units 16 (e.g., to a seed tube of the row unit) and configured to generate a modified signal (referred to herein as a "seed pulse") indicating the deposition of a seed by the row unit 16. The seed sensors 420 preferably comprise optical sensors such as those disclosed in U.S. Pat. No. 4,163,507, "Optical Seed Sensor for a Seed Planter Monitor," issued Aug. 7, 1979, the disclosure of which is hereby incorporated herein in its entirety by reference.

The population rate at each row unit 16 is preferably controlled and monitored by a planter monitor 50, which is preferably mounted in a cab of the tractor and preferably includes a memory, a processor and a graphical user interface. The planter monitor 50 is preferably a monitor such as that disclosed in U.S. Pat. No. 8,738,243, "Planter Monitor System and Method," issued May 27, 2014, ("the '243 Patent") or in U.S. Pat. No. 8,078,367, "Planter Monitor System and Method," issued Dec. 13, 2011, ("the '367 Patent"), the disclosures of which are hereby incorporated herein in their entirety by reference. The planter monitor 50 is preferably configured to allow a user to enter plot placement parameters as disclosed in International Patent Application Publication WO 2012/174134 A1, "Systems and Methods for Creating Prescription Maps and Plots," published Dec. 20, 2012, the disclosure of which is hereby incorporated herein in its entirety by reference. A global positioning system ("GPS") receiver 52 is preferably mounted to the tractor for transmitting the current global location of the tractor 5 to the monitor. In other embodiments, a GPS receiver 52 is mounted to the toolbar 14.

A system 400 for gathering, comparing and analyzing planting and yield data obtained as described above is illustrated in FIG. 2. The planter GPS receiver 52 is in electrical communication with the monitor 50. The monitor 50 is preferably in electrical communication with a drive 578 associated with each row unit 16 and a seed sensor 420 associated with each row unit 16.

The system 400 also preferably includes a speed sensor 430 configured to detect the speed of the tractor 5 and/or the planter 10. In some embodiments, the speed sensor comprises a radar speed sensor associated with the tractor 5 as is known in the art. In other embodiments, the speed sensor 430 comprises a wheel speed sensor such as a Hall-effect sensor disposed to measure the rotation of a ground-engaging wheel (e.g., a lift-assist wheel) of the planter. The speed sensor 430 preferably in electrical communication with the monitor 50.

The system 400 also preferably includes a gyroscope 435 configured to generate a signal related the rotation and/or rate or rotation of the toolbar 14 of the planter 10. The gyroscope 435 is preferably in electrical communication with the monitor 50. It should be appreciated that the gyroscope 435 comprises a sensor enabling the system 400 to calculate a row-specific velocity; in other embodiments, the system includes a second speed sensor (e.g., a second wheel speed sensor) that likewise enables the system 400 to calculate a row-specific velocity.

A lift sensor 422 is preferably coupled to the planter 10 (e.g., to a lift wheel assembly configured to lift the toolbar 14) or in other embodiments the tractor 5 (e.g., to a three-point hitch of the tractor) and configured to generate a modified signal when the planter 10 is lifted. The lift sensor 422 is preferably in electrical communication with the monitor 50. In some embodiments, the lift sensor 422 comprises an implement lift switch such as those available from Dickey-John corporation in Auburn, Ill.

The monitor 50 preferably communicates data to a computer 450 (preferably a personal computer having a processor, memory and graphical user interface) via one or more data transfer devices 410 (e.g., a USB memory or a modem). The computer 450 is preferably configured to match planting data to yield data for each location in the field and to perform analysis of the same data. In other embodiments, the functions performed herein by the computer 450 are performed by the monitor 50.

In some embodiments, the computer 450 is additionally in data communication (as, for example, by an Internet connection) with a server 430. In such embodiments, the computer 450 and other computers 450-1 operated by other users may transmit planting and harvesting data to the server 430. The same data are preferably retrieved by the computer 450 for use in comparing results among fields.

Figure 3:
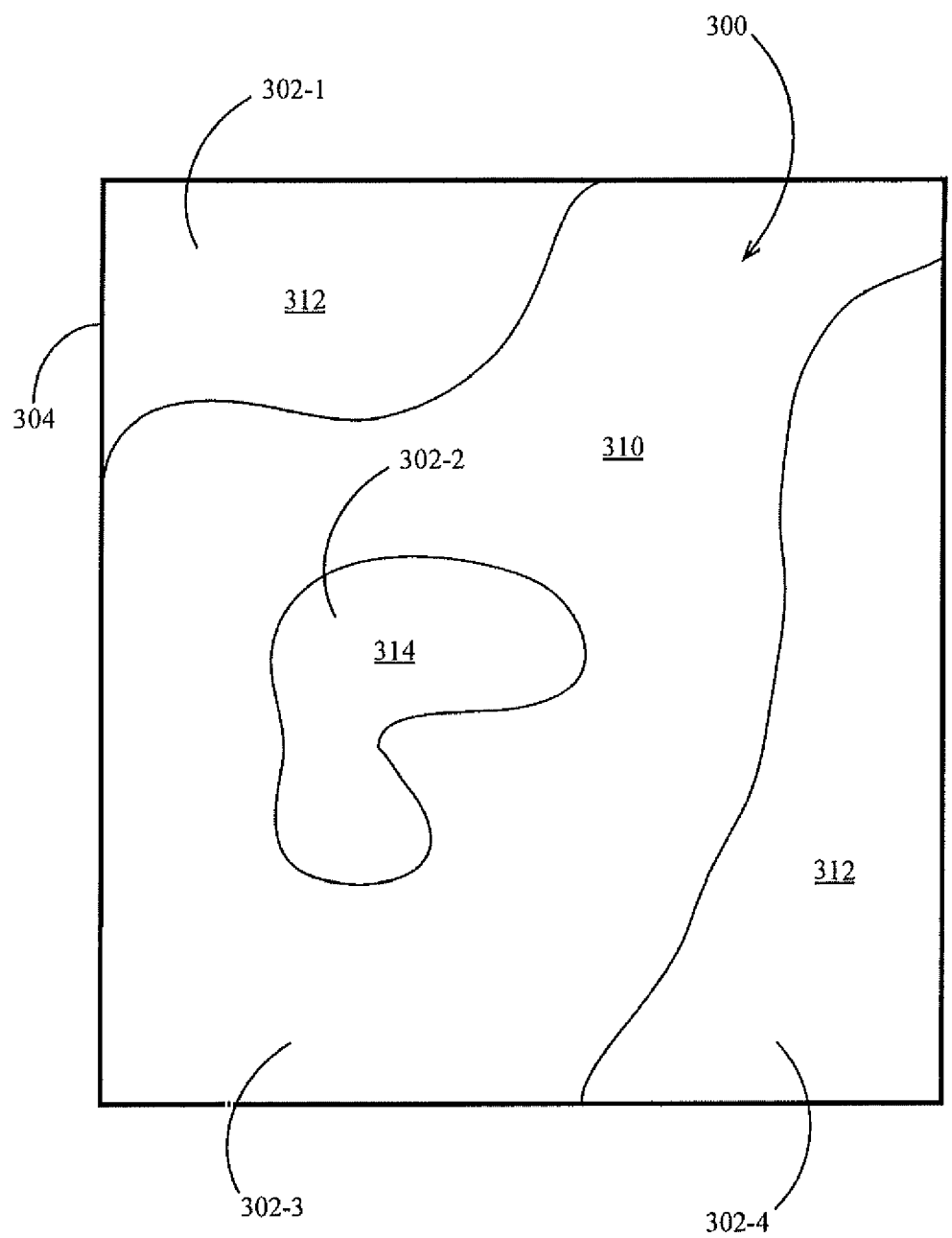
FIG. 3 illustrates an embodiment of a prescription map.
Figure 4:
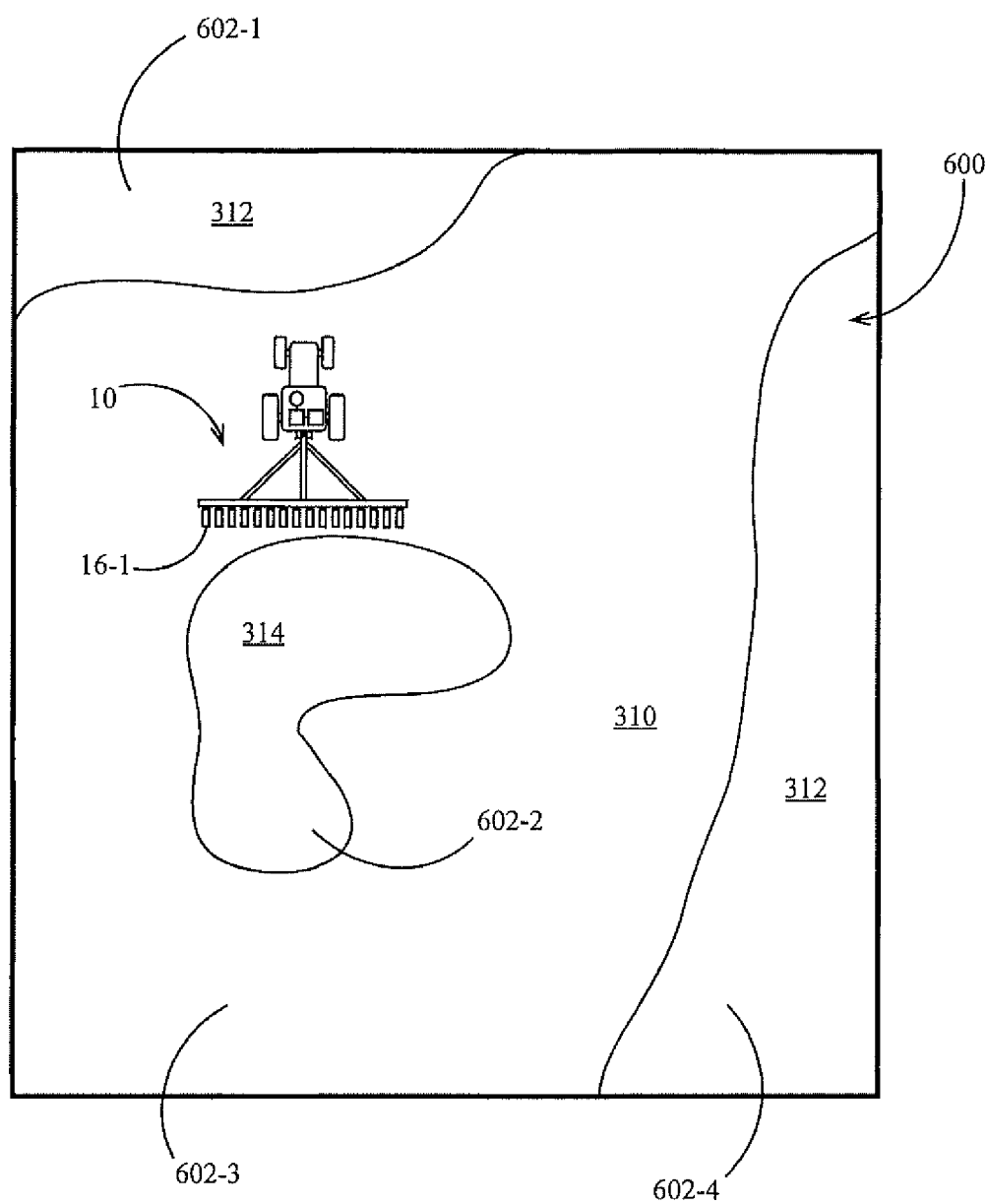
FIG. 4 illustrates the planter of FIG. 1 implementing the prescription map of FIG. 3 in a field.

Referring to FIG. 3, a population prescription map 300 is illustrated comprising several regions 302 within a field boundary 304. The prescription map 300 preferably corresponds to a file, e.g., a shapefile, stored in the memory of the monitor 50 and/or the computer 450. Each region 302 preferably comprises a polygon comprising a set of georeferenced locations (e.g., GPS vertices) within a field 600 (FIG. 4). Each region 302 is preferably associated with an application rate stored in the memory of the monitor 50 and/or the computer 450. By way of illustration, the regions 302-1,302-2,302-3,302-4 are associated with application rates 312,314,310,312 respectively.

Turning to FIG. 4, the planter 10 is illustrated planting the field 600. Regions 602 within the field 600 correspond to regions 302 in the prescription map 300 having like suffixes. Thus, as the planter traverses the field 600, the monitor 50 preferably uses a signal generated by the GPS receiver 52 to determine the location of each row unit 16 and commands the drive 578 associated with each row unit 16 to plant at the application rate associated with the prescription map region 302 corresponding to the field region 602 in which the row unit 16 is located. By way of example, at the position of the planter 10 in FIG. 4, the monitor 50 preferably determines that the row unit 16-1 is in the field region 602-3 corresponding to the prescription map region 302-3, and thus commands the drive 578 associated with the row unit 16-1 to plant at application rate 310 (e.g., 30,000 seeds per acre).

Control and Monitoring Methods

Figure 5:
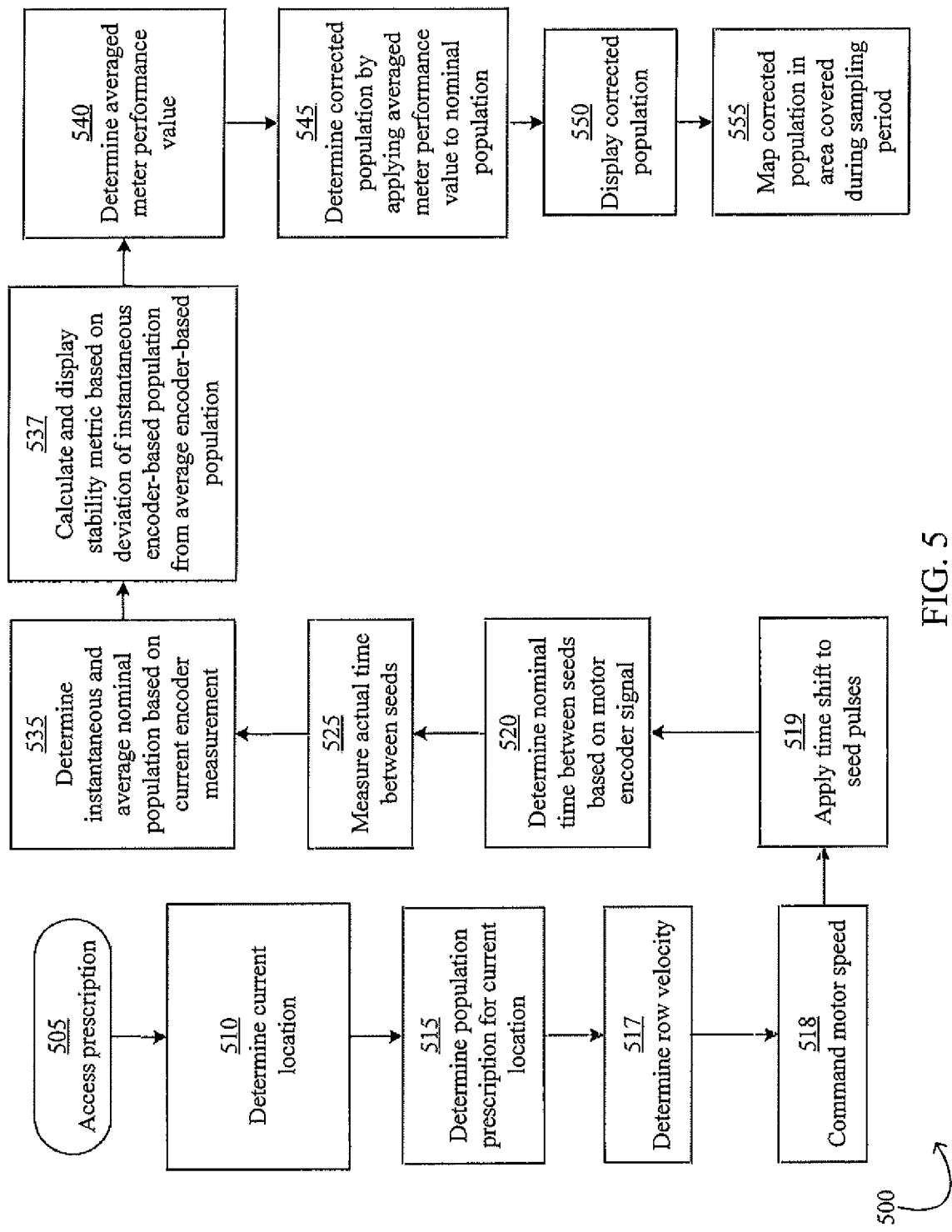
FIG. 5 illustrates an embodiment of a process for controlling a planter and gathering planting data.
Figure 6:
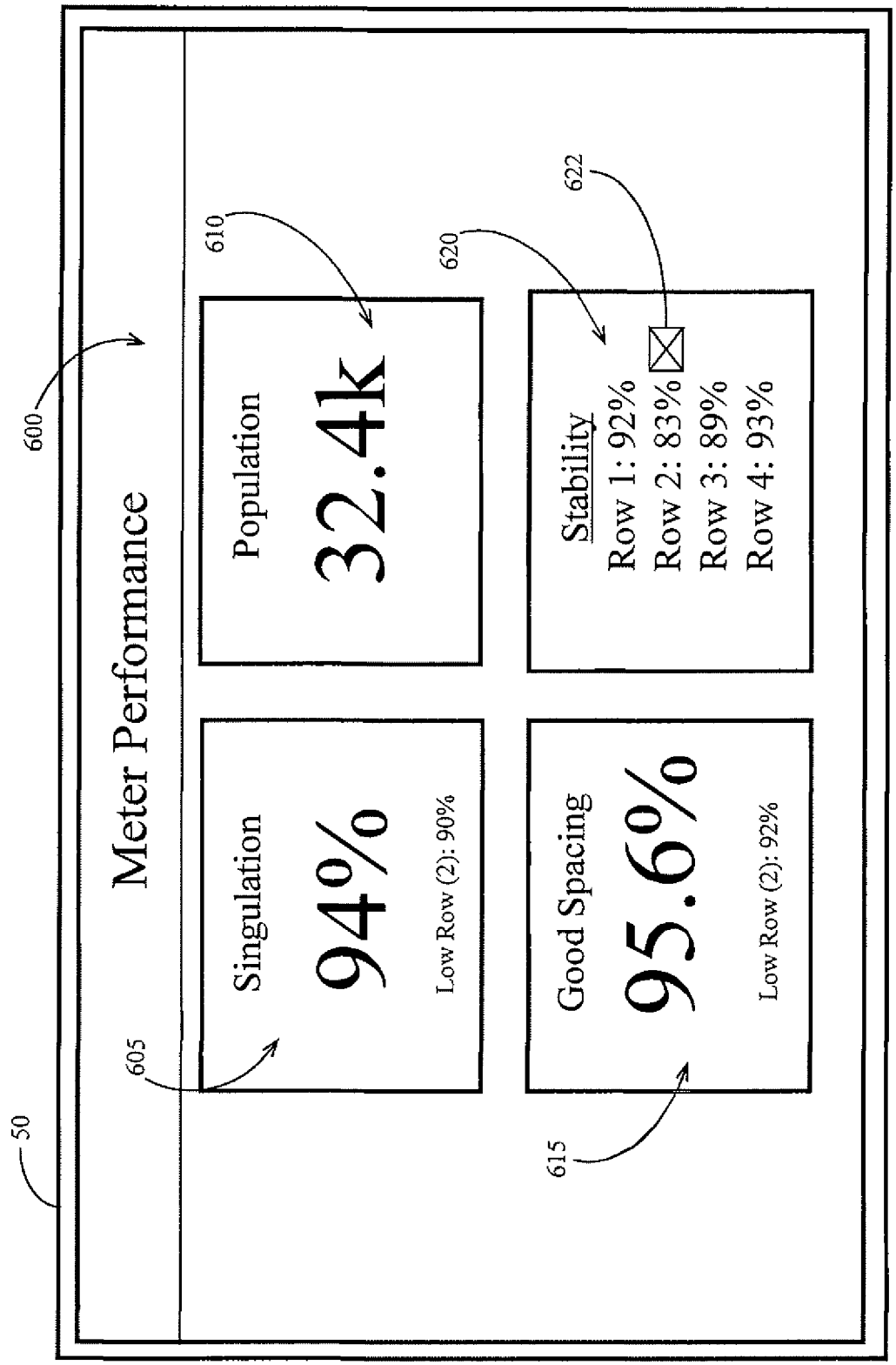
FIG. 6 illustrates an embodiment of a meter performance screen.

A preferred process 500 for controlling and monitoring population is illustrated in FIG. 5. At step 505, the monitor 50 preferably accesses a prescription map (e.g., the prescription map 300 illustrated in FIG. 3) stored in the memory of the monitor 50. At step 510, the monitor 50 preferably determines the current location coordinates of one of the row units 16 by obtaining the current location coordinates reported by the GPS receiver 52 and applying any offsets stored in the memory of the monitor 50. At step 515, the monitor 50 preferably determines the population prescription for the current location coordinates of the row unit 16.

At step 517 of the process 500, the monitor 50 preferably determines the velocity Vr of the row unit 16. In some embodiments, the monitor 50 uses the signal from the speed sensor 430 alone; it should be appreciated that in such embodiments the row velocity may be inaccurate when the toolbar 14 is turning, such as when the planter 10 is executing a turn. In other embodiments, the monitor 50 uses the signal from either the gyroscope 435 or the second speed sensor to determine a row-specific velocity as disclosed in International Patent Application Publication WO 2013/049198 A1, "Seed Delivery Apparatus, Systems, and Methods," published Apr. 4, 2013, the disclosure of which is hereby incorporated herein in its entirety by reference. At step 518, the monitor 50 preferably commands a rotational speed to the drive 578 based on the current prescription determined at step 515 and the row velocity determined at step 517. At step 519, the monitor 50 preferably applies a time shift approximately equal to the delay between a change in commanded motor speed and a change in motor speed, summed with the time required for seeds to drop from the meter to the seed sensor 420 to the seed sensor 420, such that changes in time between seed pulses are synchronized with changes in motor speed. The time shift applied at step 519 is preferably between 150 and 300 ms, and is preferably about 250 ms.

At step 520 of the process 500, the monitor 50 preferably determines the nominal time $T_{nom}$ between seeds based on the measured motor rotational speed (e.g., based on the signal communicated by the motor encoder 576), preferably using the equation:

$$T_{nom} = \frac{1}{N \times k_1 \times R}$$

Where: N is the number of seed apertures on the seed disc;
R is the measured motor rotational speed (e.g., in rotations per second);
and $k_1$ is a ratio between R and the meter rotational speed.

Step 520 of the process 500 is preferably performed at repeated intervals and is preferably performed each time a new seed pulse is received from the seed sensor 420. In other embodiments, the signal from another sensor (e.g., a Hall-effect encoder configured to measure the passage of one or more magnets mounted to the seed disc as described earlier herein, or configured to measure the passage of one or more magnets mounted to a shaft, hub or other component rotating with the seed disc) is used to measure the rotation of the seed disc.

At step 525 of the process 500, the monitor 50 preferably determines the actual time Tact between seeds by measuring the time between a seed pulse communicated by the seed sensor 420 associated with the row unit 16 and a prior seed pulse communicated by the same seed sensor 420. The step 525 is preferably performed at repeated intervals and is preferably performed each time a new seed pulse is received from the seed sensor 420.

At step 535 of the process 500, the monitor 50 preferably determines an instantaneous nominal population $P_{nom}$ based on the nominal time $T_{nom}$ between seeds, preferably using the equation:

$$P_{nom} = \frac{1}{T_{nom} \times V_r \times D_r}$$

Where: $V_r$ is the row velocity calculated at step 517; and
$D_r$ is the transverse spacing between row units 16.

At step 535, the monitor 50 preferably also determines an averaged value of $P_{nom}$ (referred to herein as $P_{ave}$) over an averaging period. The averaging period is preferably selected to correspond to the time required for a single meter revolution, which it should be appreciated will vary based on meter speed. In some embodiments, the desired averaging period is determined by calculating the time required for a single rotation of the seed disc at the instantaneously commanded or measured meter rotation speed.

At step 537, the monitor 50 preferably calculates and displays a stability metric. The stability metric is preferably a measure of the performance of the seed meter in driving the seed disc. The stability metric is preferably related to the consistency of operation of the seed meter in driving the seed disc. The stability metric is preferably related to the sufficiency of available torque to consistently drive the seed disc. The stability metric is preferably based on at least one of a commanded meter speed, a commanded meter drive speed, a commanded meter rotation angle, and a measured meter rotation angle. In some embodiments, the stability metric S is based on a deviation of the instantaneous population $P_{nom}$ from the averaged population $P_{ave}$, preferably determined as described herein. In some such embodiments, the stability metric S is calculated according to the equation:

$$S = 1 - \frac{\lfloor P_{nom} - P_{ave} \rfloor}{P_{ave}}$$

At step 540 of the process 500, the monitor 50 preferably determines an averaged meter performance value Rm related to seed meter performance, e.g., to the successful singulation of seeds (i.e., deposition of seeds one at a time) by the meter. The ratio Rm is preferably calculated using the equation:

$$R_m = \frac{\Sigma_{-N}^{0} T_{nom}}{\Sigma_{-N}^{0} T_{act}}$$

Where: $T_{act}$ and $T_{nom}$ are determined for each of the last N seeds; and
N is preferably between twice the number of seeds on the seed disc and 2200, and is preferably about 500. In other embodiments, N is another integer multiple of the number of seeds on the seed disc, e.g., 15. In other embodiments the meter performance value Rm is another value related to meter performance; for example, the meter performance value Rm may be calculated as one minus the fraction of "skips" (preferably calculated as defined in the '243 Patent) detected over the previous N seeds.

At step 545 of the process 500, the monitor 50 preferably applies the averaged meter performance value of actual to nominal time between seeds to the averaged nominal population to determine a corrected population Pc, preferably using the equation:

$$P_c = R_m \times P_{ave}$$

At step 550 of the process 500, numerical and/or graphical representations of each corrected population Pc measurement are preferably displayed sequentially to the user. At step 555, each corrected population Pc measurement is preferably mapped in a region of a population map (e.g., a population map as disclosed in U.S. Provisional Patent Application 61/675,714, previously incorporated by reference) corresponding to the area covered by the row unit 16 during a measuring interval (e.g., 200 ms) associated with the measurement.

It should be appreciated that the process 500, particularly steps 520 and 525, compares nominal to actual meter performance based on predicted and actual times between successive seeds. In other embodiments, the process 500 may be carried out by instead measuring the predicted and actual number of seeds detected in a predetermined time (e.g., 200 milliseconds).

The monitor 50 preferably displays a meter performance screen 600. The meter performance screen 600 preferably includes a population window 610 displaying the corrected population value calculated as described herein. The population window 610 may display the corrected population value for individual row units or averaged across the planter or subsets of the row units. The meter performance screen 600 preferably includes a stability window 620 displaying the stability metric calculated as described herein. The stability window 620 preferably displays the stability metric calculated for each row unit as described herein. The stability window 620 preferably also displays an alarm graphic 622 if the stability metric (e.g., for an individual row) is below a threshold, e.g., 85%. The meter performance screen 600 preferably also displays other planter performance data calculated as described in the '367 patent, including a singulation window 605 and a good spacing window 615 for displaying singulation and good spacing values, respectively. It should be appreciated that the monitor 50 may display planter performance data other than meter performance data (e.g., downforce data and soil data) on the meter performance screen 600 or other selectively displayed screens.

Although the stability metric and nominal population calculations are described herein using encoder signals, it should be appreciated that the same calculations can be performed by determining motor speed, meter speed, or nominal time between seeds based on any measurement or command signal related to the rotation or rotational speed of the motor or a gear or seed disc driven by the motor. Thus the drive 578 may comprise any electric motor including a brushed electric motor, a brushless electric motor, stepper motors, and may comprise other drives such as hydraulic drives.

Although the systems and methods disclosed herein are illustrated and described with respect to the rate at which seeds are planted, in other embodiments the same systems and methods are applied to other crop inputs applied using variable application implements other than planters. For example, in some embodiments the rate at which liquid fertilizer is applied using a variable rate application system is varied and monitored using the methods presented herein.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method for monitoring performance of a seed planter planting seeds using a metering system including a seed meter and a seed meter drive, the method comprising:
    generating metering system motion signals upon movement of a component of the seed metering system;
    measuring a rotational metric of a seed disc of the seed meter during an averaging period by counting a first set of the motion signals during the averaging period;
    measuring the rotational metric during a measuring period by counting a second set of the motion signals during the measuring period; and
    calculating a stability metric based on a statistical deviation between the value of the rotational metric during the measuring period and the value of the rotational metric during the averaging period.

2. The method of claim 1, wherein the stability metric is a measure of the performance of the seed meter in driving a seed disc of the seed meter.

3. The method of claim 1, wherein the rotational metric comprises at least one of a commanded meter speed, a commanded meter drive speed, a commanded meter rotation angle, and a measured meter rotation angle.

4. The method of claim 1, wherein the rotational metric comprises a rotational speed of the seed meter drive.

5. The method of claim 1, wherein the stability metric is based on a comparison of a current value of the rotational speed of the seed disc with an averaged value of the rotational speed of the seed disc.

6. The method of claim 1, wherein the stability metric is based on a deviation between a current nominal population and an averaged nominal population, wherein the current and averaged nominal populations are each calculated based on the rotational metric of the seed disc.

7. The method of claim 1, wherein the rotational metric comprises a deviation between a current nominal time between seeds and an averaged nominal time between seeds.

8. The method of claim 1, wherein the averaging period comprises at least two full rotations of the seed disc.

9. The method of claim 1, wherein the rotational metric comprises a rotational speed of the seed disc.

10. The method of claim 1, wherein generating metering system motion signals upon movement of a component of the seed metering system comprises generating the metering system motion signals responsive to deposition of individual seeds.

11. The method of claim 10, wherein generating metering system motion signals upon movement of a component of the seed metering system comprises generating the metering system motion signals with an optical sensor.

12. The method of claim 1, further comprising displaying the stability metric on a screen.

13. The method of claim 12, wherein displaying the stability metric on a screen comprises displaying stability metrics corresponding to each of a plurality of seed planters.

14. The method of claim 12, further comprising displaying a threshold stability metric on the screen.

* * * * *